Figure 1:
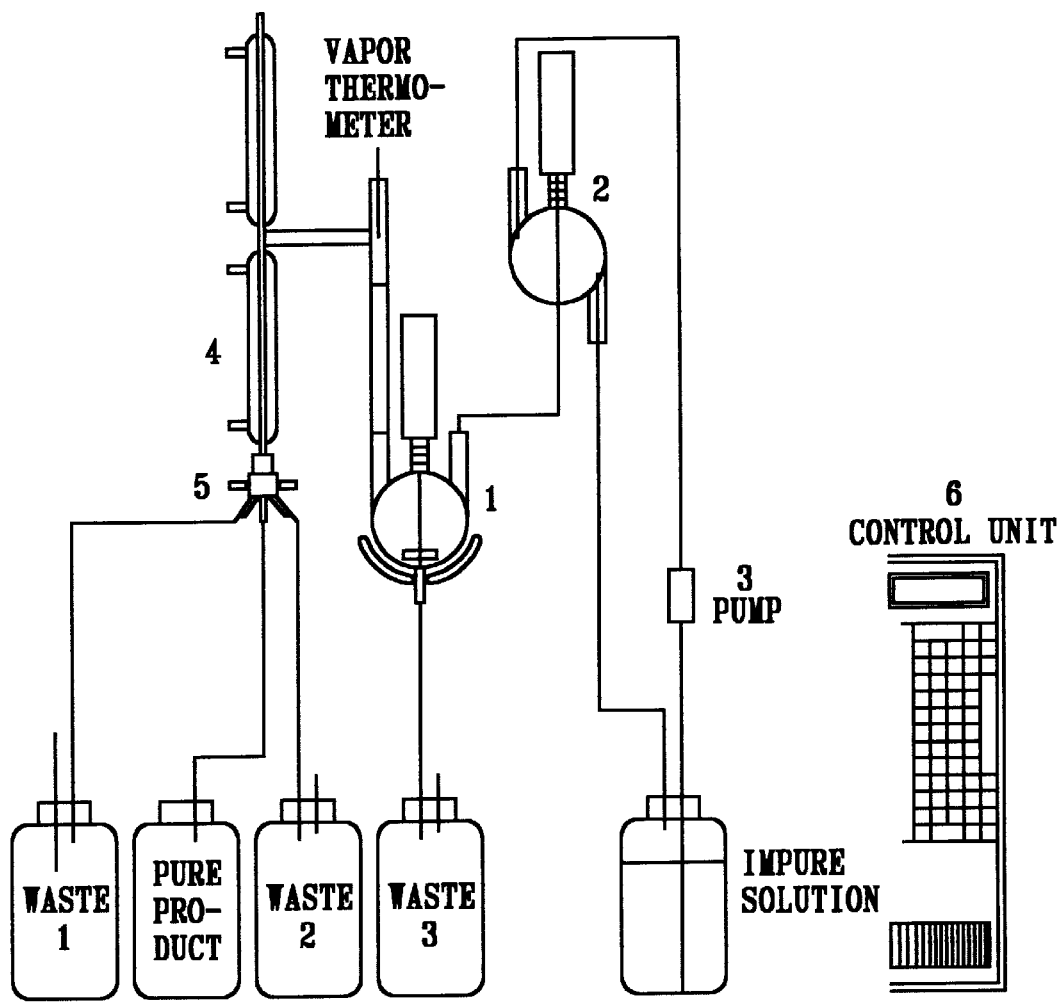

United States Patent [19]
Manninen

[11] Patent Number: 6,113,860
[45] Date of Patent: Sep. 5, 2000

[54] AUTOMATIC RECYCLING DEVICE FOR LABORATORY SOLVENTS AND VOLATILE CHEMICALS

[75] Inventor: Antti P. Manninen, Helsinki, Finland

[73] Assignee: Pam Solutions Ltd. Oy, Helsinki, Finland

[21] Appl. No.: 09/051,817

[22] PCT Filed: Oct. 21, 1996

[86] PCT No.: PCT/FI96/00554

§ 371 Date: Aug. 25, 1998

§ 102(e) Date: Aug. 25, 1998

[87] PCT Pub. No.: WO97/15366

PCT Pub. Date: May 1, 1997

[30] Foreign Application Priority Data

Oct. 19, 1995 [FI] Finland .................................. 955005

[51] Int. Cl.[7] ........................................................ B32B 5/18
[52] U.S. Cl. ........................... 422/103; 422/99; 422/102; 202/82; 202/241; 366/273
[58] Field of Search .............................. 422/99, 100, 101, 422/102, 103, 104; 436/43, 174, 179, 180, 183; 366/273, 286, 247; 202/82, 239, 241

[56] References Cited

U.S. PATENT DOCUMENTS 3,998,704  12/1976  Follain et al. .
4,818,706   4/1989  Starr ......................................... 436/180
4,873,057  10/1989  Robertson et al. ........................ 422/75
5,174,864  12/1992  Arbizzani et al. .
5,236,555   8/1993  Yuan ........................................ 202/153
5,609,735   3/1997  Hetzel et al. .............................. 203/52
5,776,418   7/1998  Besnier et al. .......................... 422/68.1

FOREIGN PATENT DOCUMENTS 0 259 002 A2  3/1988  European Pat. Off. .

*Primary Examiner*—Long V. Le
*Attorney, Agent, or Firm*—Skinner and Associates

[57] ABSTRACT

An automatic cleaning equipment for solvents and volatile chemicals that enables the re-use of substances used in a laboratory. In a distillation vessel (1) there is a combination stirrer, which stirs, measures the temperature and acts as a base valve. In the combination stirrer, there is a tube made of inert material, there is a stirrer motor and a solenoid or motor operating the base valve. Inside the tube, there is a drive magnet rotating on an axle, and a temperature sensor. The actual paddle of the stirrer contains two magnets and is rotated outside the tube by the drive magnet. A filling vessel (2) is equipped with a separate base valve and overflow pipe. A fraction cutter (5) permits taking of a pre-fraction, a main fraction and post-fraction.

9 Claims, 6 Drawing Sheets

AUTOMATIC RECYCLING DEVICE FOR LABORATORY SOLVENTS AND VOLATILE CHEMICALS

SUMMARY

This invention concerns easy-to-use automatic cleaning equipment for solvents and volatile chemicals, by means of which substances used in a laboratory, and which have previously been sent to a waste treatment plant tor incineration, can be cleaned and reused. In the distillation vessel of the equipment, there is a new kind of combination stirrer, which stirs, measures the temperature of the mixture and acts as a base valve. The filling vessel, equipped with a separate base valve and overflow pipe, increases the operating reliability and safety of the equipment. A new kind of fraction cutter permits the taking of a pre-fraction, a main fraction and post-fraction during distillation.

GENERAL

The use of solvents is essential in chemical work. When producing substances, the original substances are usually dissolved in an inert solvent which is removed by distillation after the reaction. In chemical analysis, the compounds being examined are diluted with a pure solvent, after which the diluted mixture is examined with analytical devices, for example, a chromatograph or a sprectrometer. Particularly in liquid and column chromatography, pure solvents are used in the course of the analysis to elute the mixture through the column, creating a large amount of only slightly polluted solvent.

In recent years, most of the solvents used have been sent either directly to waste disposal or to a waste treatment plant for incineration. In the smallest units, such as colleges, environment-monitoring laboratories and other small laboratories, solvents are collected in a waste/solvent store, from where they are sent once or twice a year to a waste treatment plant, usually for incineration. In laboratories at larger industrial plants, waste solvents may, however, be cleaned on the spot in larger batches, if suitable equipment is available.

The recycling of solvents at the point of use is economical, saves natural resources and also promotes work safety, because large amounts need not be stored in a solvent store or transported for disposal.

This invention describes equipment operating on new principles, which automatically cleans solvents and other volatile chemicals, and which permits even small laboratories to recycle these substances. The equipment is small and fits easily into normal fume chambers. In addition, the amounts of solvents heated in the equipment at any one time are quite small (250 ml–2 l), which improves work and fire safety. The automatic repetition of the cleaning process, however, also allows large amounts of substances to be cleaned.

Solvents can be easily cleaned using the new equipment that is the object of the invention. The suction hose of the pump is placed in the vessel containing the solution to be cleaned and the clean product goes to the collection vessel. The equipment can also be easily dismantled for cleaning, so that the same device can be used to automatically clean several different substances. This is important in laboratories using relatively small amounts of several different solvents.

In terms of work safety, it is also important that large amounts of flammable or harmful substances are not used at one time in automatic equipment.

In the following text, the construction of the equipment is described in greater detail in terms of inventiveness. The text is illustrated by the following figures.

FIG. 1. General layout of the chemical recycling device.

Figure 2:
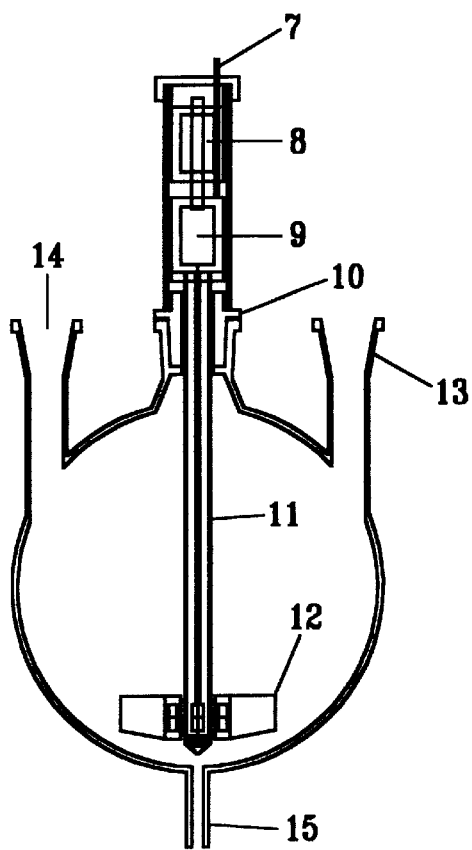

FIG. 2. The combination stirrer attached to the distillation vessel.

Figure 3:
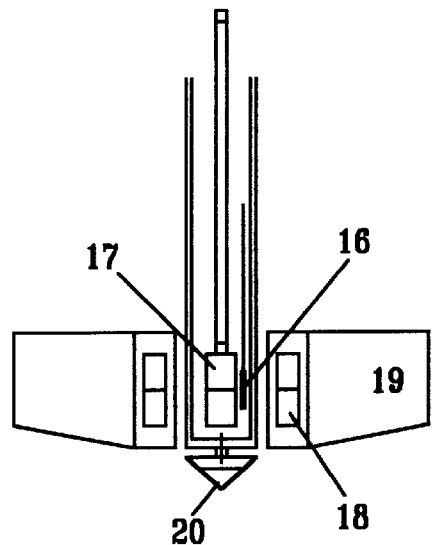

FIG. 3. Detail of the combination stirrer.

Figure 4A:
Figure 4B:

FIGS. 4a & b. Paddle of the combination stirrer.

Figure 5:
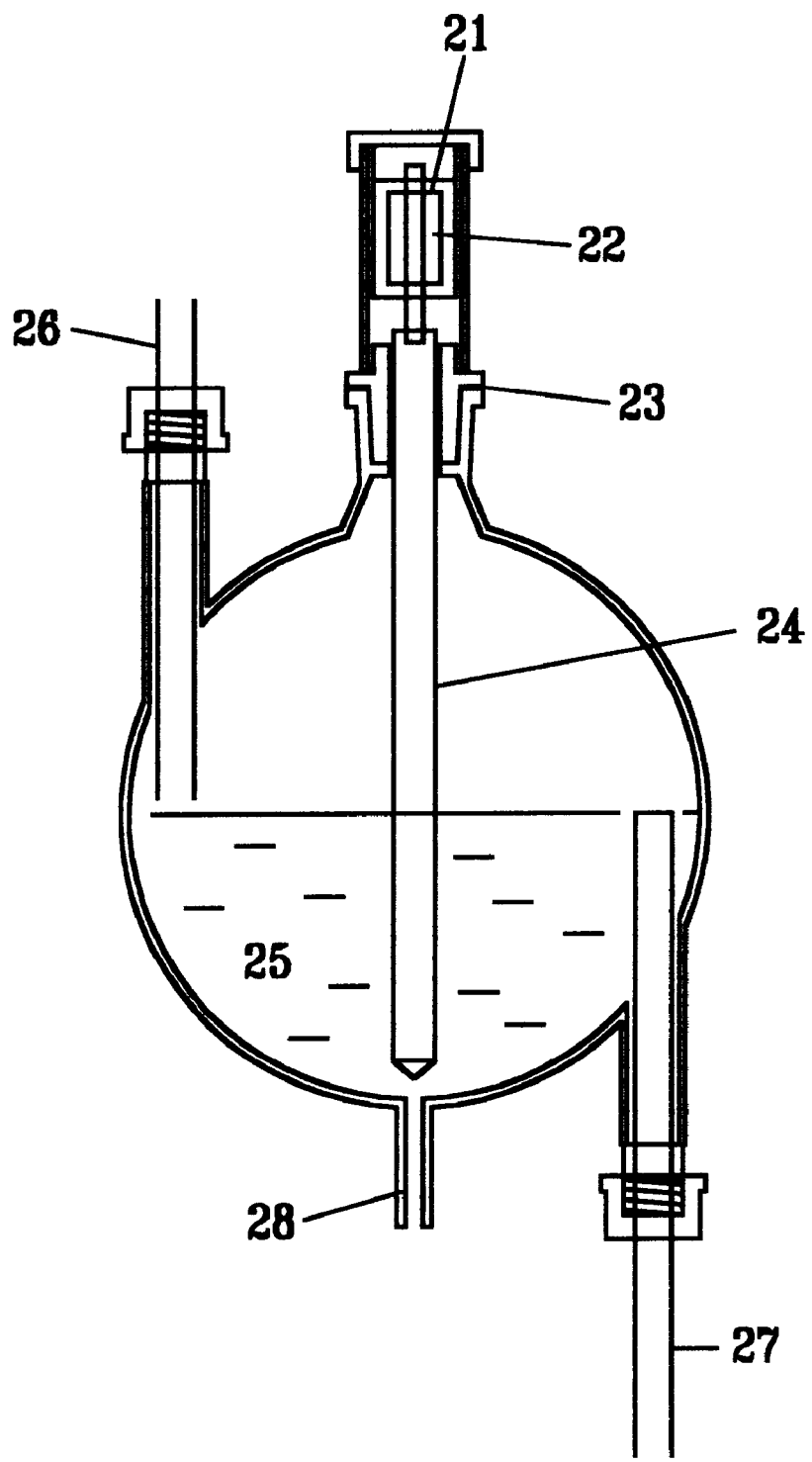

FIG. 5 Solvent filling vessel.

Figure 6A:
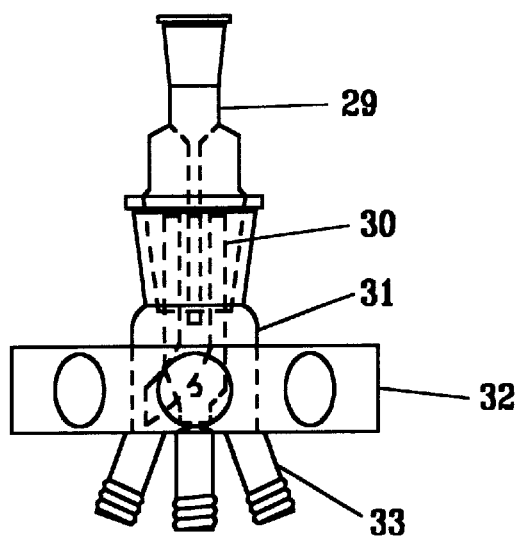
Figure 6B:
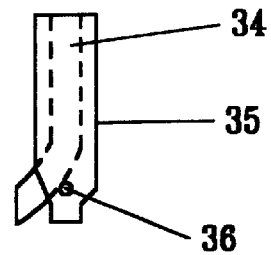

FIGS. 6a, b, c & d. Electrically-operated fraction cutter.

Figure 7A:
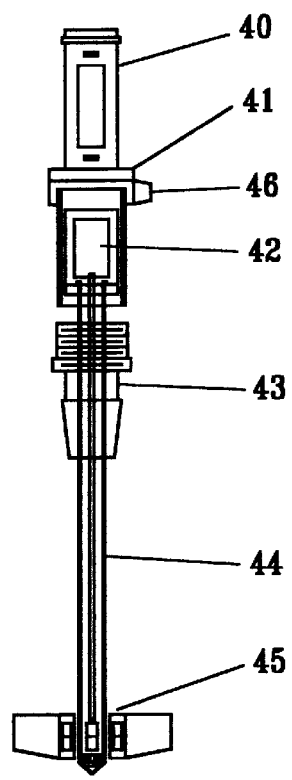

FIGS. 7a & b. Independent stirrers.

Figure 8A:
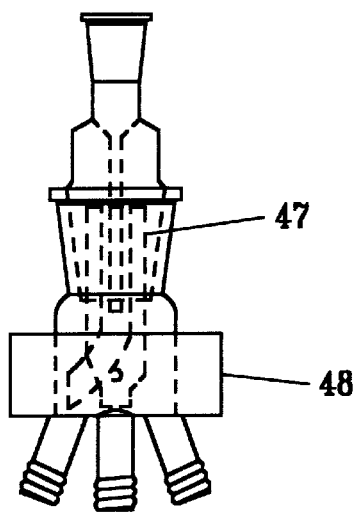

FIGS. 8a, b, c & d. Manually-operated fraction cutter.

CONSTRUCTION

The equipment (FIG. 1) comprises:
a) Heatable reaction vessel (1), with a new kind of combination stirrer, comprising a magnetic stirrer, temperature sensor and base valve.
b) Filling vessel (2) equipped with a base valve, and solvent pump (3)
c) Condenser (4) and fraction cutter (5)
d) Control unit (6)

Advantages of the equipment

The reaction vessel (FIG. 1. (1)) described in the invention makes the equipment simple and easily cleaned. The separate filling vessel/pump combination accelerates the start of a new distillation phase, prevents, in a simple manner, overfilling, and, if necessary, participates in the pre-cleaning cycle, in which pump (3) circulates the solution to be cleaned through a separate cleaning cartridge, before filling the reaction vessel. A new kind of magnetically-operated fraction cutter (5) activated on the basis of the temperature of the distillation vapor, permits the removal of a pre-fraction (WASTE 1), a main fraction (CLEAN PRODUCT) and a post-fraction (WASTE 2), as well as, if necessary, the recirculation of the pre- and post-fractions through the cleaning process, for example, in order to remove a difficult-to-separate impurity from ternary azeotropic distillation.

Reaction vessel

Stirring the mixture is the best way to ensure even boiling during distillation. In laboratory work, stirring is usually carried out by a mechanical motor stirrer or a magnetic stirrer.

Generally, it has been difficult to seal the rotor axle of a motor stirrer, conventional stirrer systems being 'sealed' with mercury or paraffin oil. These methods are old-fashioned and do not withstand variations in pressure, permitting the locking liquid to splash out of the sealing cup. On the other hand, it is difficult to maintain a vacuum or pressure in stirrers using journal bearings and they wear out rapidly. A conventional magnetic stirrer is suitable for mixing solutions in, for example, titration and in distillation, if the reaction vessel has no base valve. These sealing systems have usually been made from glass or steel, while polytetrafluorpolyethylene (PTFE) or ground glass has been used in the journal bearings.

The most tightly sealed laboratory stirrer is probably the magnetic stirrer. It it, a PTFE coated magnet is rotated in the solution being mixed, with the aid of a larger external magnet, In place of an external permanent magnet, use is also made of a rotting magnetic field, induced by means of coils, when external components are not required. A conventional magnetic stirrer is suitable for mixing solutions in titration, for example, and also in distillation, if the reaction vessel has not base valve. However, its power is insufficient if sediment forms during the reaction, or it the mixture is otherwise highly viscous Nowadays, powerful magnetic transmissions are used in large laboratory reactors, but they are generally heavily built and are not suitable for small-scale laboratory work or for particularly corrosive reaction conditions.

The ideal laboratory stirrer should be well-sealed and sufficiently powerful. It should be able to operate continuously, even though the reactor is heated or cooled, or if chemicals are added to it or liquid layers removed from it. In addition, the stirrer should be constructed in such a way that leaves as much space and openings as possible far additional devices required in work, such as condensers and other accessories. In automatic distillation, a base valve is needed for the removal of distillation residue, preventing the use of conventional magnetic stirrers.

At present, measurements of temperature and other solution and reaction mixture measurements are carried out with measurement sensors, taken to the reaction vessel through separate openings, Typical measurements are the temperature or the pH value. In pH measurements, the temperature sensor is often in the same measuring rod as the pH-electrode. In automatic distillation, measurement of the temperature of the distillation mixture is important for controlling the cleaning process.

Conventionally, small ration vessels are emptied after cooling by pouring out the contents. In heavy reactors, or those that are fixed in place, emptying takes place through a separate base valve. Rod-like base valves have also been developed, which enter through the upper opening of the reaction vessel, while they are closed by screwing a rod into the outlet in the base.

The chemical recycling device according to the invention (FIG. 1) characteristically has a combination stirrer, acting as a mixer, temperature sensor and base valve. The combination stirrer enters the reaction vessel through a suitable opening. The combination stirrer (FIG. 2) is formed of a tube-like member (11), which is sealed with a suitable intermediate component (e.g. Teflon) (10), but which can nevertheless slide to some extent upwards and downwards. At the lower end of the tube, the stirring component (12) that is outside the tube and is made of Teflon or another suitable material is rotated by motor (9). The end of the tube closes the outlet (15) in the base of the vessel, which opens and closes with the aid of a solenoid magnet (or motor) (8), moving the entire stirrer motor component (9) and tube (11). Leads for stirring control, base valve control and the temperature sensor run in the same cable. The reaction vessel is filled through opening (13), the distillation vapors, the temperature of which is measured at the upper end of the column, passing into the column through opening (14), while distillation residue is removed through opening (15).

FIG. 3 shows the components of the combination stirrer in greater detail. Magnet (17), which is carried by bearings and rotated by the motor, rotates the stirrer paddle (19), which is made from e.g. Teflon and is outside the tube, and has two separate magnets (18) embedded in it. The temperature sensor (16) is located at either the side or bottom of the lower end of the tube, making it possible to measure the temperature of even small quantities of solvent. The boss (20) of the base valve is made of Teflon, or some other suitable sealing material.

One model of the paddle of a combination stirrer is shown in FIGS. 4a and b. When the combination stirrer is pulled out of the reaction vessel, the paddle component remains in the vessel as the magnetic forces diminish. The separate paddle is removed through the neck of the vessel. This arrangement allows separate, and even large stirrer paddles to be removed from the reaction vessel through a small neck. The magnets can be cast into the Teflon or placed there in separate holes closed with plugs.

One of the components of the cleaning equipment's combination stirrer is a magnetic stirrer. A magnetic stirrer as such is an ordinary piece of laboratory equipment and many different kinds of them have been patented. For example, the stirrers described in German patents[1,2] and in USA patents[3,4] are sufficiently well sealed and have no bearings that wear out, but they do include a drive magnet outside the vessel and prevent the use of a base valve.

Filling vessel

The filling vessel (FIG. 1. (2)) is an important part of the cleaning device. It prevents the reaction vessel (1) torn overfilling, even during pump (3) malfunction. It permits new mixture for distillation to be rapidly added to the reaction vessel, and a new distillation to be started at once. When the reaction vessel (1) is heated by an electrical jacket heater, the heat capacity of the jacket tends to overheat the empty vessel after distillation. Thus, solution must be added quickly, so that it does not begin to gradually distill too soon.

FIG. 5 shows the filling vessel in greater detail. The solution enters the vessel through pipe (26) and its surface (25) settles at the level of the overflow pipe (27). The solution returns from the overflow pipe to the same vessel from which it was originally pumped. A solenoid (or motor) (22) opens the base valve (28), from which the solution flows into the reaction vessel for distillation. The solenoid is controlled through cable (21). An adapter (23) made from Teflon or other suitable material permits the spindle (24) of the valve to move sufficiently upwards or downwards. Sealing is by means of a journal bearing or flexible bellows. In addition to topping up the filling vessel, the pump may also circulate impure solution to the filling vessel through a cleaning cartridge or extraction device and back to the solution vessel. This provides one more cleaning stage, when distillation alone is not an adequate cleaning method.

Fraction cutter

A simple, easy-to-use fraction cutter (distillate cutter) (FIG. 1, (5)) is an essential part of a recycling cleaner. The new fraction cutter (FIGS. 6a, b, c & d) shown here differs from conventional cutters in that there is a component (30) that rotates inside the cutter due to magnetic forces, and which directs the arriving flow of distillate to the desired outlet pipe. In conventional fraction cutters, component (30) is of the same piece as the upper section (29), while the lower section (31) is rotated manually, causing the distillate to drip into a suitable outlet pipe (33). In this case all the distillate vessels, or the hoses connected to them, also rotate.

Precision stills use an electromagnetic distillate guide to boil the distillation solution by returning it, and now and then guide the distillate to a collecting vessel, by using a solenoid magnet to turn a suspended glass channel (with iron or a magnet inside it).

Figure 6C:
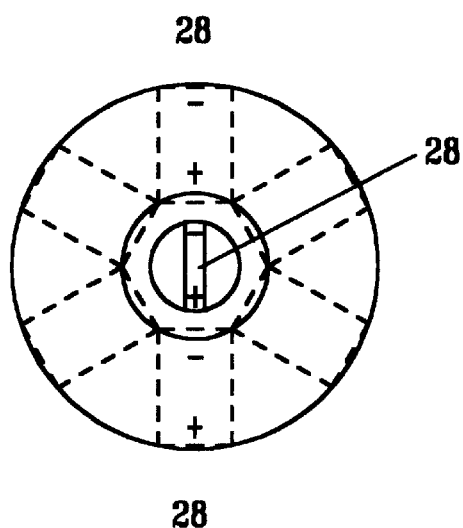
Figure 6D:
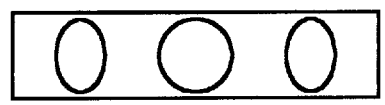

The present invention typically cuts the distillate automatically by means of magnets (FIG. 6c, (37) and (38)), which in turn rotate magnets (36, 39) and also internal component (30) to the desired outlet pipe (33).

It is typical of the invention that the two magnets (FIG. 6c, (37) and (38)) act on the rotating magnet (39) simultaneously. In this way, a more powerful rotation is created through the simultaneous magnetic pushing and pulling. There may be two or more external pairs of magnets (37) and (38). In the example (FIG. 6c) there are three pairs of magnets, allowing it to cut the distillate into three outlet pipes. It is also possible to use a single external magnet to create a sufficient magnetic effect.

Figure 8B:
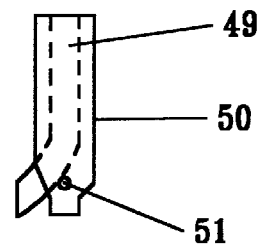

The internal component of the fraction cutter (FIG. 8b) may be of the same piece as the frame component (35) and the magnet (36), or else it may comprise a separate internal pipe (34), support piece (35) and magnet (36).

Other advantages of the invention

Figure 7B:
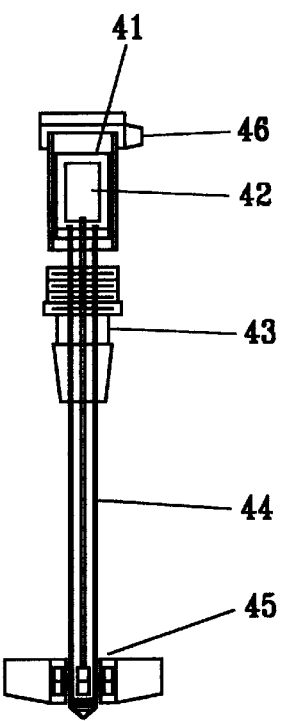

The parts of this invention can be used as independent devices to facilitate work in a chemical laboratory. Two separate simpler versions of the combination stirrer can be used independently. The examples in FIG. 7a show a combined stirrer-thermometer and a separate rod stirrer (FIG. 7b), both of which are required in a laboratory. The stirrers can be sealed and can thus be used for vacuum distillation or work in an inert atmosphere. Instead of the temperature sensor in the combination stirrer, there may be some other known measurement sensor.

In the example of the stirrer in FIG. 7a, there is a thermometer (40), power cable (41), stirring speed control (46), motor (42), a sealed adapter to attach the stirrer to the reaction vessel (43), the stirrer shaft (44) and the stirrer paddle, as well as a measurement sensor (45). The stirrer in FIG. 7b does not have a thermometer.

The manual version of the fraction cuter (FIGS. 8a, b, c & d) has advantages over a conventional fraction cutter. In the solution shown here, the neck need not be rotated and the collection of the distillate can be switched from one outlet pipe to another by rotating the external magnet ring.

Figure 8C:
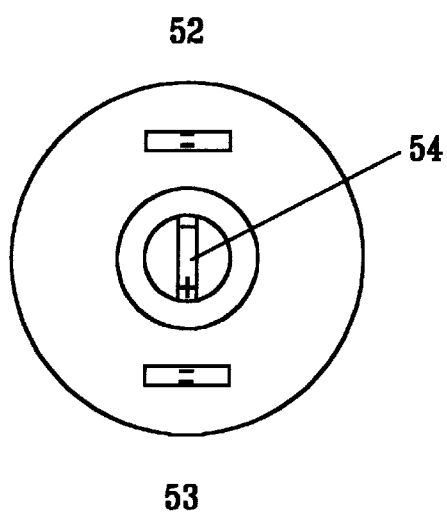
Figure 8D:
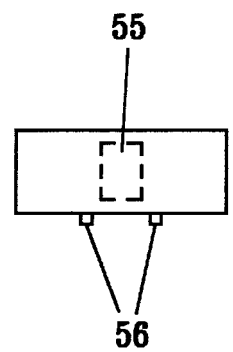

The components of the manual fraction cutter are similar to those of the electrically-operated cutter. In FIG. 8a, the rotatable magnet ring (48) contains two permanent magnets (FIG. 8c, (52) and (53). The inner piece (47) rotates due to the forces acting on the magnet (54). The studs on the outer ring (FIG. 8d, (56)) lock into place on either side of the outlet pipe, directing the flow of distillate into the desired branch.

REFERENCES

[1] Joseph Bŏing, Volkmar Rudolph and Dieter Müller, Rohm GmbH, 6100 Darmstadt, Deutsches Patent 2017472,

[2] Heinz Müller, 7152 Aspach, Deutschland, Deutsches Patent 3122018.

[3] Gregory J. Macmichael and Norman A. de Bruyne, 3700 Brunswick Pike, Princeton, N.J., USA, European Patent Application 87306734.2.

[4] David L. Eaton, et al., USA, U.S. Pat. No. 4,483,623.

What is claimed is:

1. Automatic cleaning and recycling equipment for volatile solvents and chemicals, comprising:
    (a) a distillation vessel and a combination stirrer positioned within the distillation vessel, the combination stirrer including a magnetic stirrer and a measurement sensor and further forming a base valve in the distillation vessel;
    (b) a solvent filling vessel equipped with a solvent return pipe and a base valve, the distillation vessel being in fluid communication with the solvent filling vessel through the base valve of the solvent filling vessel; and
    (c) a fraction cutter made from an inert material, the fraction cutter being in fluid communication with the distillation vessel.

2. The automatic cleaning and recycling equipment of claim 1, wherein the equipment is adapted for automatically repeating a cleaning operation.

3. The automatic cleaning and recycling equipment of claim 1, wherein the the magnetic stirrer of the combination stirrer includes a motor, a tube component extending into the distillation vessel wherein the tube component has an interior and an exterior, a drive magnet positioned in the interior of the tube component and rotated by the motor, and a stirrer paddle operably positioned about an exterior portion of the tube component wherein the stirrer paddle contains magnets operably positioned with respect to the drive magnet and adapted to be driven by the rotating drive magnet.

4. The automatic cleaning and recycling equipment of claim 3, wherein the combination stirrer paddle is elongated in shape and includes an opening through which the tube component extends.

5. The automatic cleaning and recycling equipment of claim 1, wherein the measurement sensor of the combination stirrer is located in the interior of a lower part of a tube component.

6. The automatic cleaning and recycling equipment of claim 1, wherein the base valve of the distillation vessel formed by the combination stirrer includes a sealing piece positioned at a lower end of the tube component corresponding to an opening in the distillation vessel to an outlet pipe and wherein a solenoid magnet or motor is adapted for moving the tube component to close and open the outlet pipe.

7. The automatic cleaning and recycling equipment of claim 1, wherein the solvent filling vessel prevents overfilling of the distillation vessel, prevents premature commencement of distillation, expedites commencement of the cleaning cycle, and permits precleaning cycling of the solution through a filling pipe and the solvent return pipe, base valve formed by a valve spindle operable connected to a solenoid magnet or motor, the valve spindle extending from and through a suitable sealed opening in an upper part of the vessel to an outlet pipe opening in a bottom part of the vessel.

8. The automatic cleaning and recycling equipment of claim 1, wherein the fraction cutter includes one or more electrically-operated magnets and an internal piece with a magnet operably positioned with respect to the one or more electrically-operated magnets, and the flow of distillate is directed to a desired outlet pipe by turning the internal piece.

9. The automatic cleaning and recycling equipment of claim 1, wherein the fraction cutter includes one or more permanent magnets set in an external ring and an internal piece with a magnet operably positioned with respect to the one or more permanent magnets and wherein the flow of distillate is directed to a desired outlet pipe by turning the internal piece.

* * * * *